United States Patent
Riester et al.

[11] 3,793,670
[45] Feb. 26, 1974

[54] WINDSHIELD WASHER ASSEMBLY

[75] Inventors: William C. Riester, Williamsville; Bronislaus S. Graczyk, Snyder, both of N.Y.

[73] Assignee: Trico Products Corporation, Buffalo, N.Y.

[22] Filed: Aug. 9, 1971

[21] Appl. No.: 170,139

[52] U.S. Cl. .............................. 15/250.04, 239/248
[51] Int. Cl. .............................................. B60s 1/46
[58] Field of Search 15/250, 250.01, 250.02, 250.03, 15/250.04, 250.35, 250.22, 250.2, 250.06; 239/284, 521, 522, 518

[56] References Cited
UNITED STATES PATENTS

| | | | |
|---|---|---|---|
| 1,228,658 | 6/1917 | Gaines | 239/521 X |
| 1,507,350 | 9/1924 | Franzen | 239/522 |
| 1,931,605 | 10/1933 | DuPuis | 239/284 |
| 2,632,911 | 3/1953 | Deibel | 15/250.04 |
| 3,008,170 | 11/1961 | Marks | 15/250.04 |
| 3,010,473 | 11/1961 | McCurnin | 239/284 X |

FOREIGN PATENTS OR APPLICATIONS

| | | | |
|---|---|---|---|
| 1,913,810 | 10/1970 | Germany | 239/284 |

*Primary Examiner*—Peter Feldman
*Attorney, Agent, or Firm*—E. Herbert Liss

[57] ABSTRACT

A windshield wiper cleaning system includes an arm mounted spray nozzle. The nozzle includes a baffle projecting from a base member having a surface at a compound angle with respect to the member for dispersing the fluid into a conical shaped configuration of droplets and directing the array of droplets toward the windshield in the path of the windshield wiper. Washer solvent under pressure is directed through an orifice toward the baffle. A nipple is provided at the orifice to which flexible tubing extending along the length of the arm is connected at one end. At the other end the tubing is connected to a washer pump so that washer fluid can be directed through the tubing and the orifice against the baffle. In another embodiment a second baffle is provided which intersects the stream of the fluid and directs the stream toward the first baffle which in turn deflects the fluid to the windshield in a substantially conically shaped array of droplets. The provision of the second baffle results in increased directional control and in more finely divided droplets.

3 Claims, 6 Drawing Figures

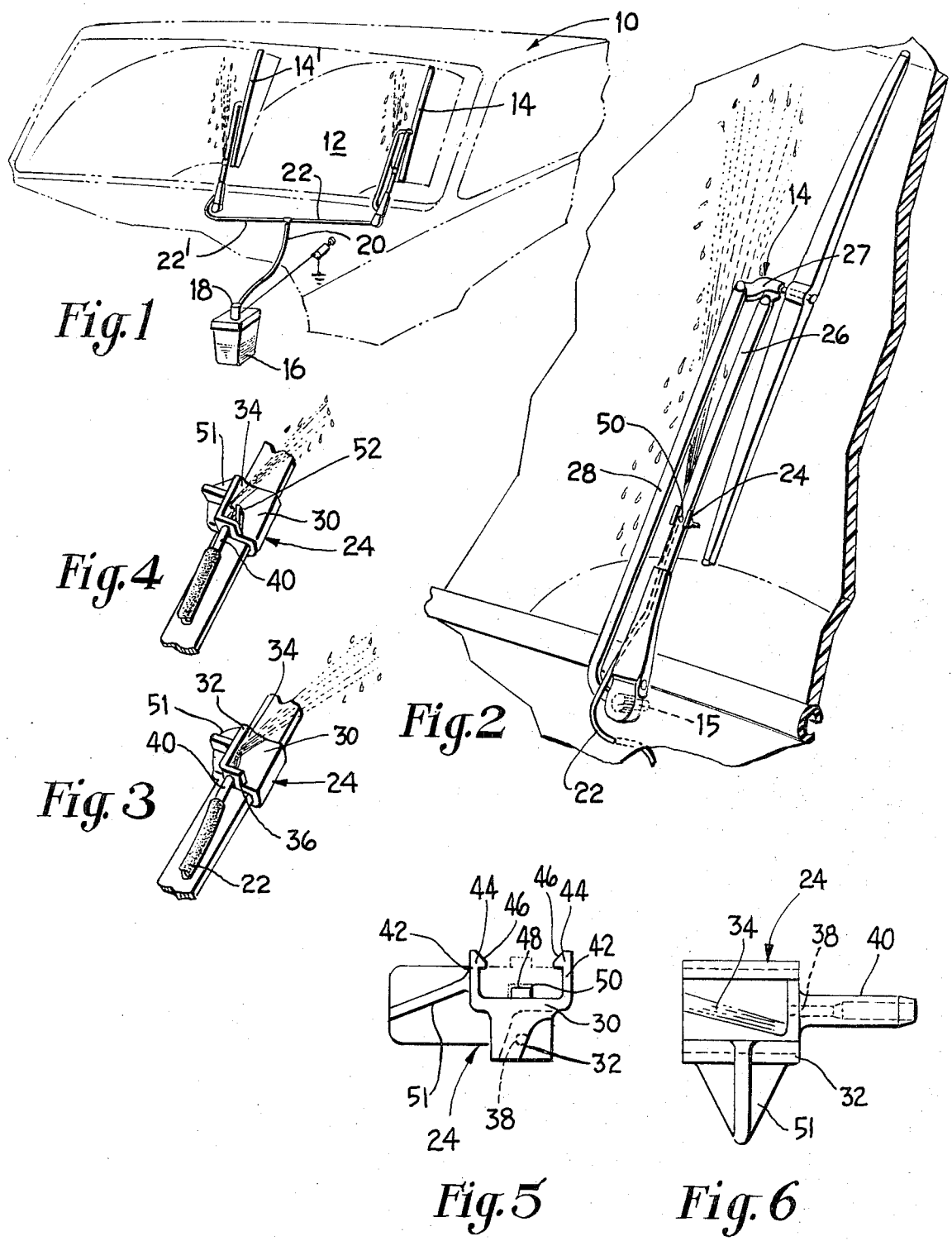
PATENTED FEB 26 1974
3,793,670
INVENTORS
WILLIAM C. RIESTER and
BY BRONISLAUS S. GRACZYK,
E. Herbert Liss
ATTORNEY

WINDSHIELD WASHER ASSEMBLY

BACKGROUND OF THE INVENTION

The invention relates to a windshield washer assembly and more particularly to an arm carried nozzle for a windshield washer construction.

Arm carried windshield washer solvent distributing nozzles are known which provide a spray rather than an undesirable solid stream. Nozzles of this type for washing systems are shown in U.S. Pat. No. 2,632,911, issued Mar. 31, 1953, by Raymond A. Deibel and U.S. Pat. No. 3,008,170 issued Nov. 14, 1961 by William J. Marks. The former disclosure requires a specific construction of the wiper blade to provide a deflecting face on the upper portion of the wiper blade. The disclosure of the latter mentioned patent utilizes a rod member in the path of the nozzle stream for breaking up the stream into droplets. Neither of the above mentioned disclosures provides for accurate direction of the fluid stream, and both of these disclosures permit promiscuous spraying of fluid toward the outboard side of the windshield. If fluid is directed outboard on a rapidly moving vehicle, moisture can be blown into an open window at the side of the passenger or operator compartment and, furthermore, can be sprayed into the path of the wiper as it moves outboard, thereby permitting washer solvent to enter the passenger compartment. With applicants' constructions the solvent is positively directed toward the windshield in an accurate pattern and can be arranged so that it is always directed toward the inboard side of the windshield wiper.

SUMMARY OF THE INVENTION

A unique nozzle assembly is provided which includes a base member having a baffle projecting therefrom at a compound angle contoured to direct the fluid toward the shield and an orifice disposed to project fluid under pressure therethrough against the baffle, thereby breaking up the stream of fluid into small particles and dispersing the fluid into a broad spray directed toward the windshield. A flexible tube is connected to the orifice and is clamped along the length of the arm at various points. The flexible tube extends through the cowl of the vehicle and is connected at its other end to the outlet of a washer pump. On the opposite surface of the base of the nozzle there extends from each edge thereof a resilient leg having inwardly extending lugs which cooperate to provide clamping means for retaining the nozzle on the windshield wiper arm. The baffle projects toward the windshield. With this construction the fluid is positively dispersed and directed in a desired direction and may be so applied as to direct the solvent only toward the inboard side of the blade. In another embodiment of the invention a second baffle is provided which directs the fluid from the orifice toward the first baffle; the first baffle in turn further disperses and directs the fluid toward the windshield. With this arrangement the fluid is even more finely divided so as to provide a very fine spray—more desirable for windshield washing.

The primary object of the present invention is to provide a simple but effective nozzle for positively directing and dispersing fluid under pressure toward the surface of a windshield.

Another object of the invention is to provide a nozzle which may be readily mounted on the wiper arm for movement therewith and which will disperse the solvent into fine particles and positively direct it in a preselected pattern toward the windshield.

Other objects and advantages of the invention will be apparent from the following detailed description taken in connection with the accompanying drawings.

BRIEF DESCRIPTION OF THE DRAWINGS

FIG. 1 is a fragmentary perspective view of a motor vehicle embodying the invention;

FIG. 2 is an enlarged fragmentary view of a portion of the windshield shown in FIG. 1;

FIG. 3 is a perspective view of the preferred embodiment of the nozzle of this invention;

FIG. 4 is a perspective view similar to FIG. 3 of another embodiment of the invention;

FIG. 5 is a front elevational view of the nozzle of the invention; and

FIG. 6 is a bottom elevational view of the invention.

DETAILED DESCRIPTION OF THE PREFERRED EMBODIMENTS

In FIG. 1 there is shown a motor vehicle 10 with a windshield 12 having a pair of wiper arm and blade assemblies 14 and 14' mounted on pivot shafts 15 at the cowl of the vehicle for oscillatory movement in an arcuate path across the outer surface of the windshield for wiping the same. A reservoir 16 may be suitably mounted within the engine compartment of the vehicle and includes a suitable pump 18 having its outlet connected through flexible conduit 20, 22 and 22' to nozzles 24 mounted on the arms of the wiper assemblies 14 and 14' respectively. The windshield wiper assembly 14 is shown in greater detail in FIG. 2 and includes an arm of the compound oscillating type having a main arm 26 secured to a pivot shaft 15 at one end and to a pivot block 27 at the other end. A drag link 28 is pivotally connected at one end to a pivot pin (not visible) adjacent pivot shaft 15. At its other end it is pivotally connected on an axis parallel to but spaced from the axis of main arm 26 of the pivot block 27 forming a parallelogram linkage for pivoting the blade with respect to the arm as the assembly traverses its arcuate path. The conduit 22 may extend beneath the main arm 26 and may be secured thereto in any suitable or desirable manner.

Looking now at FIGS. 3, 5 and 6, the nozzle comprises a base 30 having a wall 32 constituting baffle means or deflecting means projecting therefrom. The baffle means 32 includes a surface 34 which may lie in a plane at a compound angle to the base 30 extending obliquely with respect to the base and sloping outwardly therefrom. A radius may be provided at the junction of wall 32 and the base 30 at the surface 34 to increase the angle of the spray and to more positively direct the spray toward the windshield. Extending laterally from the wall 32 is a wall 36 having an orifice 38 and a nipple 40 communicating with the orifice 38. Projecting from the edges of the opposite surface of the base 30 are a pair of legs 42 having inwardly extending lugs 44 in opposition to each other. The lugs 44 may be chamfered at their free ends as at 46. A dimple 48 is provided on the base intermediate legs 42. The legs 42, lugs 44 and dimple 48 constitute clamping means or mounting means for securing the nozzle to the arm 26 of the wiper assembly. The flexible tube 22 may be attached to the nozzle 24 at the nipple 40 to provide means for directing a stream of fluid under pressure through the orifice 38. The nozzle is secured to the arm 26 by snapping the legs 42 on the flat portion of the arm extension with the legs 42 and lugs 44 embracing the arm extension. The dimple 48 may seat in a recess 50 formed in the arm extension to prevent displacement longitudinally along the arm. A reinforced flange 51 extending laterally outward from wall 32 may be provided to serve as a blade stop to prevent entanglement of the arm and blade. The nozzle may be of any suitable material; it may be molded, stamped or fabricated. As an example, suitable plastic material such as nylon may be employed.

In operation fluid under pressure is directed from the reservoir 16 by the pump 18 through the conduits 20, 22 and 22', thence through the nipple 40 and orifice 38. The stream is directed against the surface 34 which breaks the stream and solvent into finely divided particles and affects their spreading into a substantially conical shaped array and directs the spray toward the windshield. The baffle may be located so as to direct the spray inboard of the wiper blade on the driver's side as shown. In the case where opposed wiper operation as distinguished from parallel wiper operation as shown is employed the spray may be directed inboard on both wipers.

In another embodiment shown in FIG. 4 an additional or second baffle 52 is provided which has a surface lying in a plane at an acute angle to the surface 34 but which is spaced from the surface 34 at the apex of the acute angle. Fluid is then directed against the deflecting surface or second baffle 52, intersecting the stream of solvent, and deflected toward the baffle surface 34 which further divides the particles of fluid and directs them toward the windshield in a substantially conically shaped pattern. With this arrangement the baffle means comprising surfaces 34 and 52 provides a more finely divided spray.

A unique nozzle and means for mounting the nozzle on a wiper arm has been shown and described for the purpose of illustration which will provide a spray of finely divided particles of washer solvent, positively directed in a desired pattern and position with respect to the wiper assembly. Certain specific embodiments of the invention have been shown and described for the purpose of illustration but it will be apparent that various other modifications and embodiments are possible within the scope of the invention. For example, other and different mounting means may be employed; other and different shapes and positions of baffles may be utilized. It is to be understood, therefore, that the invention is not limited to the specific arrangements shown but in its broadest aspects it includes all equivalent embodiments and modifications which come within the scope of the invention.

What is claimed is:

1. A windshield nozzle construction comprising a base, baffle means projecting from said base for dispersing and deflecting a stream of fluid, orifice means for directing a stream of fluid toward said baffle means, means for directing fluid under pressure through said orifice, said baffle means includes a first deflecting surface and second deflecting surfaces, said first deflecting surface extending obliquely to the path of said stream and intersecting therewith, said second deflecting surface forming an acute angle with the plane of said first deflecting surface but spaced therefrom at the apex of said actue angle and means for mounting said nozzle construction.

2. A windshield cleaning assembly oscillatable through an arcuate path across the outer surface of the windshield to wipe the same; a washer nozzle mounted on said windshield cleaning assembly and movable therewith, said washer nozzle comprising a base having an uninterrupted surface, a first solid wall upstanding from said base having an orifice extending therethrough, a second wall upstanding from said base disposed substantially perpendicular to said first wall, said second wall having a first deflecting surface forming baffle means disposed at an obtuse angle relative to said base and at an acute angle relative to said first solid wall intersecting the path of a stream of solvent discharged from said orifice and means for supplying a solvent under pressure to said orifice whereby the solvent is dispersed and positively directed toward the windshield in the path of the windshield cleaning assembly.

3. A windshield washer nozzle construction according to claim 2 wherein a second deflecting surface upstanding from said base extends from said first solid wall forming an acute angle with the plane of said first deflecting surface but spaced therefrom at the apex of the acute angle.

* * * * *